United States Patent
Cooper et al.

(10) Patent No.: US 8,051,032 B2
(45) Date of Patent: Nov. 1, 2011

(54) SYSTEM AND METHOD FOR LOADING RECORDS INTO A PARTITIONED DATABASE TABLE

(75) Inventors: Brian Cooper, San Jose, CA (US);
Adam Silberstein, San Jose, CA (US);
Ramana V. Yerneni, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 582 days.

(21) Appl. No.: 12/184,183

(22) Filed: Jul. 31, 2008

(65) Prior Publication Data
US 2010/0030793 A1  Feb. 4, 2010

(51) Int. Cl.
*G06F 17/00* (2006.01)
(52) U.S. Cl. ......... 707/602; 707/610; 707/637; 711/165
(58) Field of Classification Search .................. 707/602, 707/610, 637; 711/165
See application file for complete search history.

(56) References Cited

U.S. PATENT DOCUMENTS

| | | | |
|---|---|---|---|
| 6,223,182 B1 * | 4/2001 | Agarwal et al. | 1/1 |
| 6,421,668 B1 * | 7/2002 | Yakhini et al. | 1/1 |
| 2003/0115434 A1 * | 6/2003 | Mahalingam et al. | 711/165 |
| 2006/0193632 A1 * | 8/2006 | Risbood | 398/59 |
| 2009/0319550 A1 * | 12/2009 | Shau et al. | 707/101 |

\* cited by examiner

*Primary Examiner* — Khanh Pham
*Assistant Examiner* — Alexander Khong
(74) *Attorney, Agent, or Firm* — Buchenhorner Patent Law

(57) ABSTRACT

An improved system and method for loading records into a partitioned database table is provided. A translation of records may be generated from a set of source partitions to a set of target partitions by generating a bipartite graph, determining a maximal matching using dynamic programming for a chain of nodes remaining in the bipartite graph after removing singleton edges, and generating a maximal matching after adding back the singleton edges for translation of records from the set of source partitions to the set of target partitions. The partition translation may be executed by traversing from top to bottom the set of source partitions and the set of target partitions in record key order to generate an optimal sequence of operations to transfer the records from the set of source partitions to the set of target partitions.

15 Claims, 7 Drawing Sheets

SYSTEM AND METHOD FOR LOADING RECORDS INTO A PARTITIONED DATABASE TABLE

FIELD OF THE INVENTION

The invention relates generally to computer systems, and more particularly to an improved system and method for loading records into a partitioned database table.

BACKGROUND OF THE INVENTION

In an ordered distributed database setting, records are stored in partitions, with each partition covering a particular key range. Partitions are each stored on one of many machines. Updating records in such an ordered distributed database may involve several operations. Single record inserts are handled by looking up the partition encompassing the record's key, sending the record to that partition, and inserting it there. In the case that a record insert pushes the partition size beyond a defined limit, the partition may split into two. Global load balancing may additionally shift partitions from machines with many partitions to those with few. In the case record inserts are repeatedly concentrated on some small key range, one or a few partitions receive the inserts, and subsequently execute partitions splits and moves to other machines.

However, using one-at-a-time insertion for a large number of record insertions is a poor solution. Bulk loading of a large number of records to update a large-scale distributed database is significantly more efficient than inserting records one at a time. For instance, a planning phase may identify new partitions that need to be created by splitting partitions for bulk insertion of records, partitions may be moved for global load balancing, and then the records may be inserted into the partitions. A significant challenge for efficient bulk loading of records is to create the new set of partitions from the old while minimizing the number of records written to new disk locations.

What is needed is a way to efficiently perform bulk loading of a large number of records into partitioned data tables while maintaining a balanced load across storage units in a large-scale distributed database. Such a system and method should execute partition translation between existing and new partitions efficiently by minimizing the number of records moved between partitions of data.

SUMMARY OF THE INVENTION

Briefly, the present invention provides a system and method for loading records into a partitioned database table. A bulk loader may be provided that performs a bulk insertion of a list of records into a partitioned data table by translating records that include the list of records for bulk insertion from a set of source partitions to a set of target partitions. The bulk loader may generally coordinate staging the records to be inserted, allocating and balancing of storage space through partition splits and moves, and inserting the records. The bulk loader may include an operably coupled partition translator that determines a translation of records that include the list of records for bulk insertion from the set of source partitions to the set of target partitions, and a partition transfer optimizer that determines an optimal sequence of operations to transfer records from the set of source partitions to the set of target partitions.

In an embodiment, a list of records may be received to insert into a partitioned data table in a distributed database. A translation of records may be generated from a set of source partitions to a set of target partitions mapped as a bipartite graph. An optimal sequence of operations may be determined to transfer the records from the set of source partitions to the set of target partitions. The optimal sequence of operations may be performed to transfer the records from the set of source partitions to the set of target partitions. And the records transferred to the set of target partitions may be stored.

In particular, a partition translation from a set of source partitions to a set of target partitions may be determined in an embodiment by mapping a list of records to existing partitions for insertion into a partitioned data table. Then a bipartite graph mapping a set of source partitions to a set of target partitions may be generated. Singleton edges in the bipartite graph may be removed that connect nodes representing the set of source partitions and nodes representing the set of target partitions. A maximal matching for the chain of nodes remaining in the bipartite graph may be determined using dynamic programming. Singleton edges may then be added to the maximal matching for the chain of nodes to generate a maximal matching for translation of records from a set of source partitions to a set of target partitions. And the maximal matching for translation of records from a set of source partitions to a set of target partitions may be output.

The partition translation may be executed by traversing from top to bottom the set of source partitions and the set of target partitions in record key order and selecting the partition with the next beginning record key that has not yet been processed. If the record key boundaries of the source partition cover the record key boundaries of the target partition, then a split operation and a move operation may place the target partition on a machine assigned for that target partition. If the record key boundaries of the target partition overlap the record key boundaries of the source partition, then a move operation may place the target partition on a machine assigned for that target partition. If the record key boundaries of the source partition overlaps the record key boundaries of the target partition, then the source partition may be split, a partition may be moved to the machine location assigned to the target partition, and the partition may be merged with another partition at the location assigned to the target partition to produce the target partition. Otherwise, if the record key boundaries of the target partition cover the record key boundaries of the source partition, then the source partition may be moved to the machine location assigned to the target partition and merged with the target partition. Advantageously, the invention makes loading of a large number of records much more efficient by minimizing record movement across machines and maximizing parallelism.

Other advantages will become apparent from the following detailed description when taken in conjunction with the drawings, in which:

DETAILED DESCRIPTION

Exemplary Operating Environment

Figure 1:
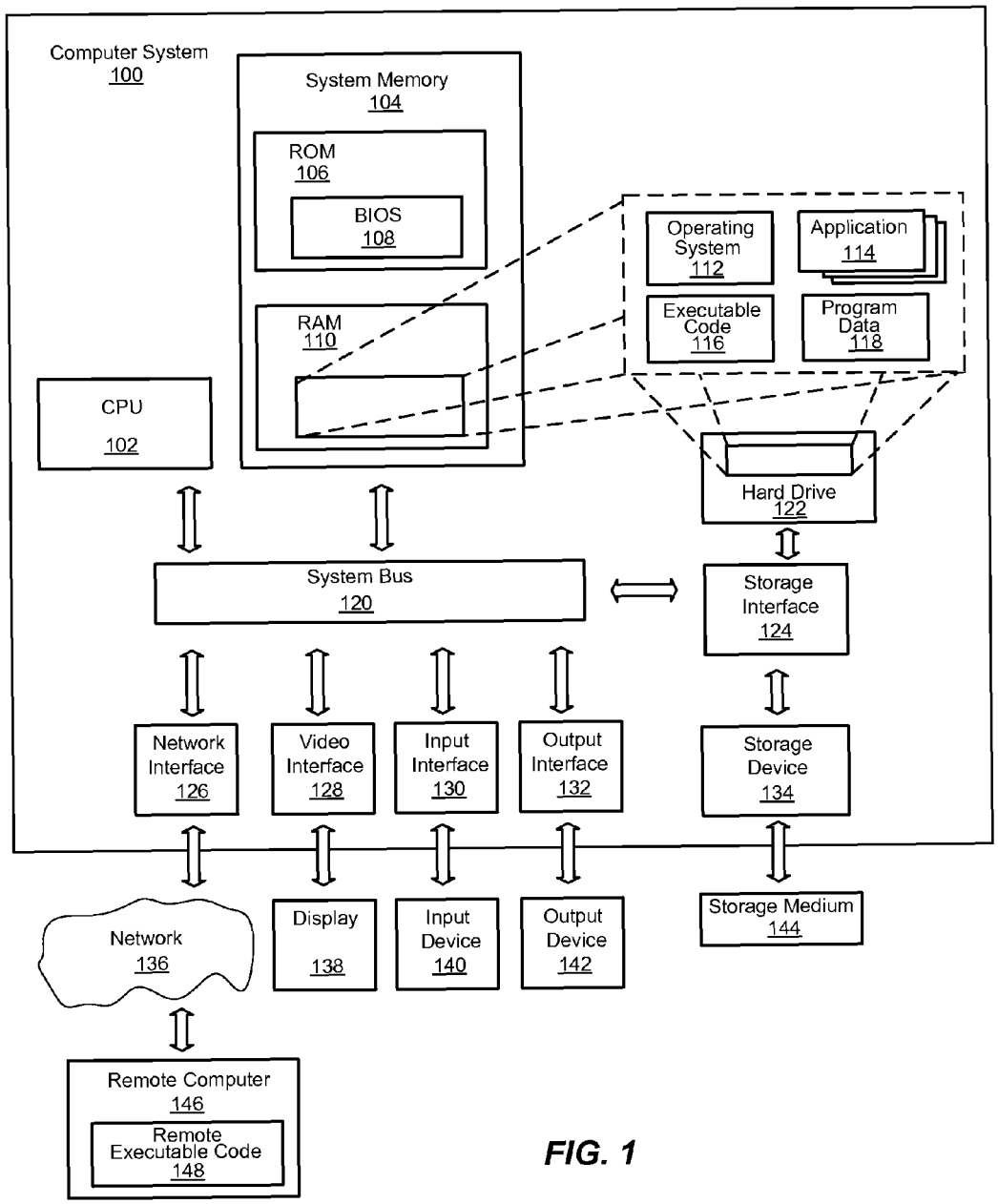
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations. Examples of well known computing systems, environments, and/or configurations that may be suitable for use with the invention include, but are not limited to: personal computers, server computers, hand-held or laptop devices, mobile phones, digital music players, tablet devices, headless servers, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used. Those skilled in the art will also appreciate that many of the components of the computer system 100 may be implemented within a system-on-a-chip architecture including memory, external interfaces and operating system. System-on-a-chip implementations are common for special purpose hand-held devices, such as mobile phones, digital music players, personal digital assistants and the like.

Loading Records into a Partitioned Database Table

The present invention is generally directed towards a system and method for loading records into a partitioned database table. Given lists of both existing and new partition key boundaries for a bulk insertion of records into existing partitioned data tables, the present invention may efficiently map partition translation between source partitions and target partitions. And the present invention may also efficiently execute partition translation to minimize the number of records moved between partitions of data by determining an optimal sequence of partition split, move and merge operations. Advantageously, the invention makes loading of a large number of records much more efficient by minimizing record movement across machines and maximizing parallelism.

As will be seen, a partition mapping from a set of source partitions to a set of target partitions may be represented by a bipartite graph and a maximal matching may be chosen to minimize record movement between source and target partitions. The partition translation may then be executed using an optimal sequence of operations to transfer records from the set of source partitions to the set of target partitions. As will be understood, the various block diagrams, flow charts and scenarios described herein are only examples, and there are many other scenarios to which the present invention will apply.

Figure 2:
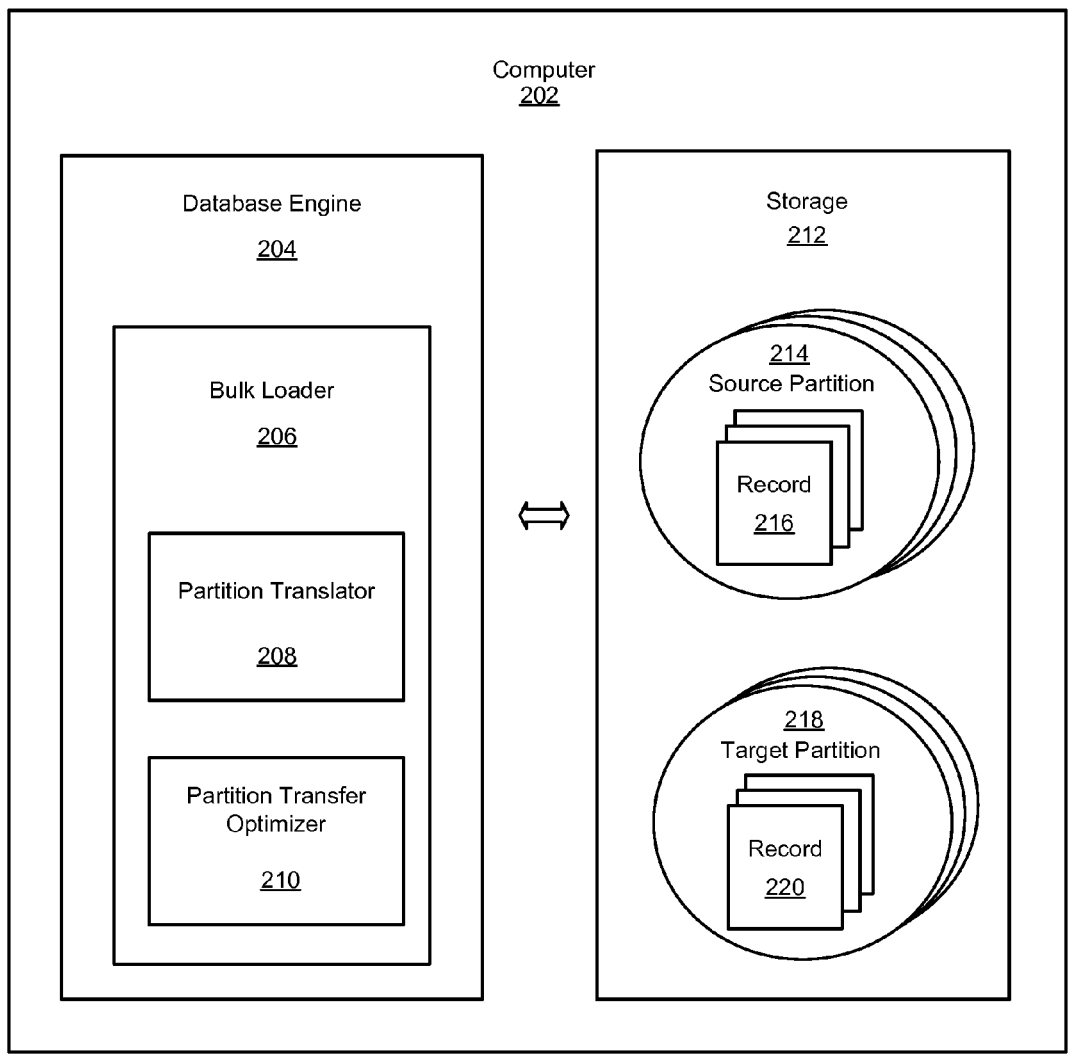
FIG. 2 is a block diagram generally representing an exemplary architecture of system components for loading records into a partitioned database table, in accordance with an aspect of the present invention.

Turning to FIG. 2 of the drawings, there is shown a block diagram generally representing an exemplary architecture of system components for loading records into a partitioned database table. Those skilled in the art will also appreciate that the functionality implemented within the blocks illustrated in the diagram may be implemented as separate components or the functionality of several or all of the blocks may be implemented within a single component. For example, the functionality for the bulk loader 206 may be implemented as a separate component from the database engine 204. Or the functionality of the partition translator 208 may be implemented in the same component as the partition transfer optimizer 210. Moreover, those skilled in the art will appreciate that the functionality implemented within the blocks illustrated in the diagram may be executed on a single computer or distributed across a plurality of computers for execution.

In various embodiments, a computer 202, such as computer system 100 of FIG. 1, may include a database engine 204 operably coupled to storage 212. In general, the database engine 204 may be any type of executable software code such as a kernel component, an application program, a linked library, an object with methods, and so forth. The storage 212 may be any type of computer-readable storage media and may store a set of source partitions 214 of database records 216 of a partitioned data table in a large-scale distributed database, and a set of target partitions 218 of database records 220 of the partitioned data table that may be translated from the set of source partitions 214 in order to perform a bulk insertion of records.

The database engine 204 may provide services for performing a bulk insertion of a list of records into a partitioned data table by translating records that include the list of records for bulk insertion from a set of source partitions to a set of target partitions. The database engine 204 may include a bulk loader 206 for determining boundaries of new partitions for bulk insertion of a list of records. The bulk loader 206 may include a partition translator 208 for determining a translation of records that include the list of records for bulk insertion from the set of source partitions to the set of target partitions, and a partition transfer optimizer 210 for determining an optimal sequence of operations to transfer records from the set of source partitions to the set of target partitions. Each of these modules may also be any type of executable software code such as a kernel component, an application program, a linked library, an object with methods, or other type of executable software code.

In an embodiment, a list of new records may be presented for loading into an existing database. Each record may be associated with a unique key, and each partition may contain records with keys that fall into a unique key range. Bulk insertion of the list of new records could proceed by taking each new record and adding it to the partition that has a key range that includes a key of a new record. This process could be continued until all new records have been inserted. In the event that a partition may grow too large during this process, the partition may be split with some records remaining in the partition and other records being moved to one or more new partitions. Instead of inserting the list of new records into their respective partitions, the list of new records in another embodiment may be analyzed to determine how many records may be added to each partition from the list of new records. For any partition that would grow too large from insertion of records from the list of new records, the partition may be split and new partitions may be created to accommodate records that will later be inserted into them. In any case, a set of source partitions with existing and new records may be identified and a set of target partitions may also be identified into which existing and new records may be moved.

In various embodiments, the bulk loader 206 may generally coordinate staging the records to be inserted, allocating and balancing of storage space through partition splits and moves, and inserting the records. Staging may include sampling the new records and arranging the new records for parallel insertion. Allocation may include splitting existing partitions and moving partitions between machines to pre-allocate storage space balanced across machines for the insertion of new records. And insertion of the records may include transmitting the new records in parallel from staging machines to their partitions assigned to machine locations.

In an embodiment, client machines may transfer the records to be bulk inserted into one or more staging machines. These staging machines may hold the data, provide key samples to the bulk loader for allocation planning, and, once allocation is complete, begin the process of inserting the data into storage units. Storage units may be data servers in the main database system that will store and serve the data once it has been bulk inserted. The bulk loader may analyze the distribution of the existing and new data and chooses a partitioning of the key range. An execution of partitioning translation from existing data partitions to new data partitions may reuse or reorganize existing data partitions on the storage units.

In general, sampling of the data records to be inserted can be used to choose good partitions without having to examine all of the data to be loaded. Partitioning may examine each existing partition and use samples to estimate the number of old and new records that fall within it. If the number exceeds the fill factor, the partition is split into some number of new partitions that, on estimation, will not exceed the factor. To move data records, each post-split partition may be examined and the number of old and new records may be estimated in each post-split partition. To maximize insertion parallelism, the bulk loader 206 may move partitions between machines to balance the total number of new records across partitions expected at each machine. Advantageously, the bulk loader 206 may minimize the sum of the time spent moving partitions and the time spent inserting data records.

Figure 3:
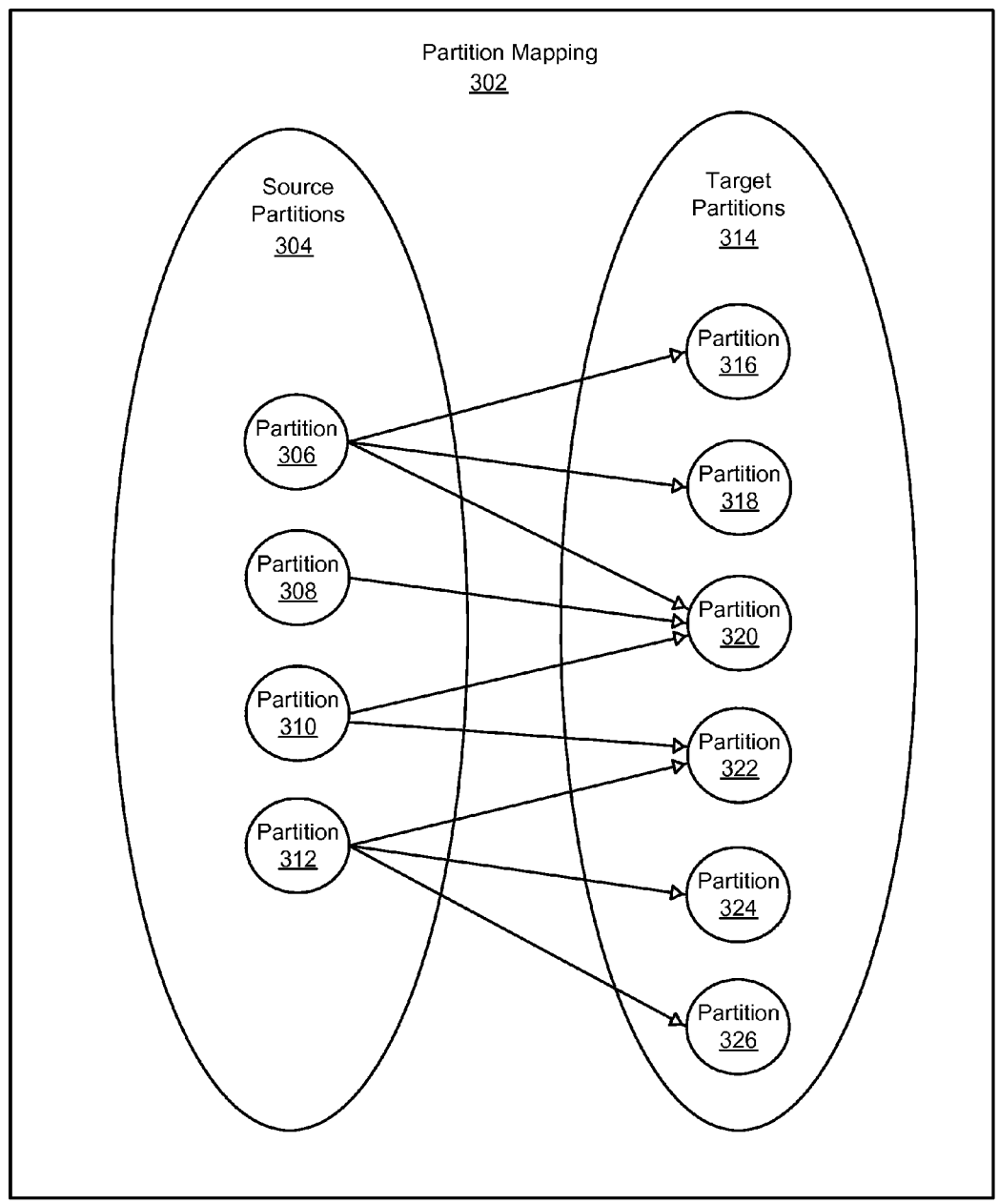
FIG. 3 is an illustration depicting in an embodiment a mapping of a set of source partitions of records of a partitioned data table to a set of target partitions of records of the partition data table, in accordance with an aspect of the present invention.

FIG. 3 presents an illustration depicting in an embodiment a mapping of a set of source partitions of records of a partitioned data table to a set of target partitions of records of the partition data table. In particular, FIG. 3 illustrates a partition mapping 302 represented as a bipartite graph with a set of source partitions 304 connected to a set of target partitions 314. The set of source partitions 304 may represent existing partitions that may be drawn as graph nodes in key order in a lefthand column, and a set of target partitions 314 may represent new partitions that may be drawn as nodes in a righthand column. The set of source partitions 304 include partition 306, partition 308, partition 310 and partition 312. The set of target partitions 314 include partition 316, partition 318, partition 320, partition 322, partition 324, and partition 326. An edge is drawn between each pair of existing and new partitions that have overlapping key ranges. The edge is labeled with a weight equal to the number of records in the existing partition that fall in the key range of the new partition. Because no edges exist between pairs of lefthand nodes and no edges exist between pairs of righthand nodes, the graph of the partition mapping 302 shown in FIG. 3 is bipartite.

In general, a graph edge between an existing and new partition may be chosen in order to designate the existing partition for translation into the new partition. Advantageously, an edge may be chosen to save the number of records given by its weight from being written to a new disk location. To do so, the following restrictions may be placed on edge selection: (1) an existing partition may not be translated into more than one new partition, and (2) a new partition may not be translated from more than one existing partition. Together, these restrictions imply that no pair of edges incident to the same node can be chosen. Accordingly, any solution that chooses a set of disjoint edges is known as a matching. To minimize the number of records written to a new disk location, a maximal matching may be chosen such that the sum of the chosen edge weights is maximized.

To choose a maximal matching, nodes incident to exactly one edge may be identified, with the exception of the very first and last nodes. For example, partition 308, partition 318, and partition 324 illustrated in FIG. 3 represent nodes incident to exactly one edge. Each such node $n_l$ has incident edge $e_l$ with weight $w_l$ and is connected to node $n_m$. Node $n_l$ and edge $e_l$ may be removed from the graph and weight $w_l$ may be subtracted from each of $n_m$'s other incident edges. Intuitively, if $n_m$ is later not in the matching solution, $n_m$ can always be added by selecting $e_l$ and increase the matching score by $w_l$. If $n_m$ has not been chosen, $n_l$ cannot have been chosen. Formally, $w_l$ is the minimum score contributed by $n_m$ in a maximal solution. By removing $e_l$ and reducing other edge weights by $w_l$, those edges are weighted with the marginal benefit in choosing them. If any is chosen, $e_l$ is not in the maximal solution; otherwise, $e_l$ is in the solution.

Node $n_l$ and edge $e_l$ may be removed from the graph and weight $w_l$ may be subtracted from each of $n_m$'s other incident edges. Note that the sum of $w_l$s is a lower bound on the maximal matching score. Once such edges are removed, the remaining maximal matching problem maximizes the marginal benefit added to lower bound. Maximizing the remaining maximal matching problem and adding back in removed edges maximizes the original matching. Assuming the edges have been instantiated in order, the computational time to detect and remove nodes and edges, and then add them back to the solution completes in O(V). Once all edges are removed, observe the remaining graph is a chain. Aside from the first and last nodes, any node incident to only one edge has been removed.

In choosing a matching for a chain, no two consecutive edges may be chosen. Dynamic programming may be used to make two scan of the edges and find the maximal matching for the chain. Consider $M(e_i)$ to denote the maximal matching found for the sub-problem for the chain starting at $e_i$ where $e_i$ is chosen. Starting at the last two edges in the chain, $e_y$ and $e_z$, the dynamic programming process may set $M(e_y)=w_y$ and $M(e_z)=w_z$, and then may traverse backward in the chain to compute $M(e_x)$. If $e_x$ is chosen, $e_y$ cannot be chosen. Because all edges are non-negative and nothing follows $e_z$, it is necessarily chosen. Thus, $M(e_x)=w_x+M(e_z)$. Next, the dynamic programming process may compute $M(e_w)=w_w+\max\{M(e_y), M(e_z)\}$, and also store whether $e_y$ or $e_z$ is in the solution. In general, to compute $M(e_i)$, either $e_k$ or $e_l$ may be chosen. If neither is chosen, $e_k$ can always be added without dropping other edges. Thus, $M(e_i)=w_i+\max\{M(e_k),M(e_l)\}$. Finally, once the dynamic programming process has reached the top of the chain and has computed $M(e_a)$ and $M(e_b)$, it may simply choose the greater of $M(e_a)$ and $M(e_b)$. Then the dynamic programming process may re-trace the edges encoded in each M function and put those in the selection. The running time of the dynamic programming process is O(V). Added to the removal process, the overall running time to solve the matching is O(V).

Figure 4:
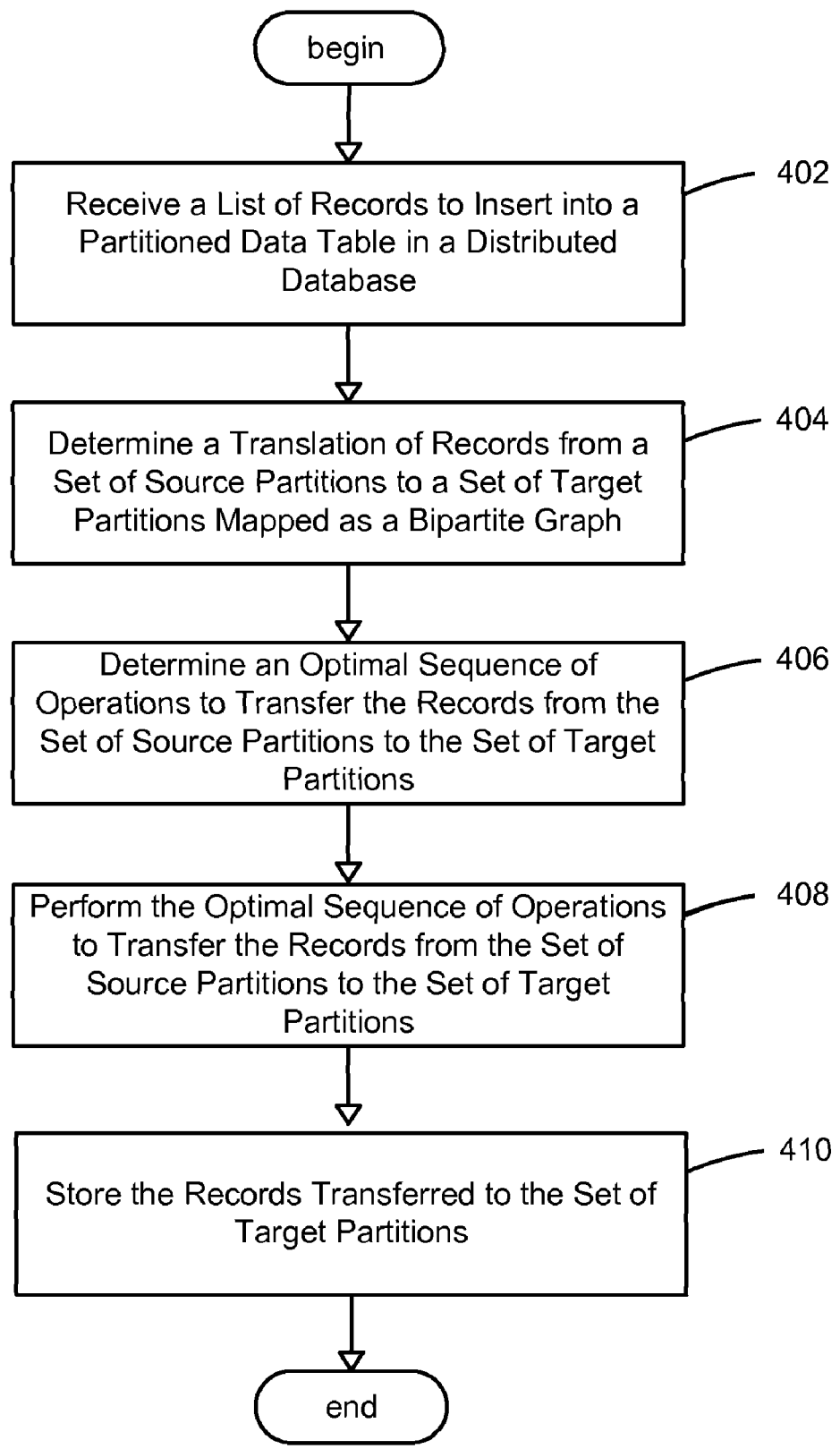
FIG. 4 is a flowchart generally representing the steps undertaken in one embodiment for loading records into a partitioned database table, in accordance with an aspect of the present invention.

FIG. 4 presents a flowchart generally representing the steps undertaken in one embodiment for loading records into a partitioned database table. At step 402, a list of records may be received to insert into a partitioned data table in a distributed database. At step 404, a translation of records may be determined from a set of source partitions to a set of target partitions mapped as a bipartite graph. At step 406, an optimal sequence of operations may be determined to transfer the records from the set of source partitions to the set of target partitions. At step 408, the optimal sequence of operations may be performed to transfer the records from the set of source partitions to the set of target partitions. And the records transferred to the set of target partitions may be stored at step 410.

Figure 5:
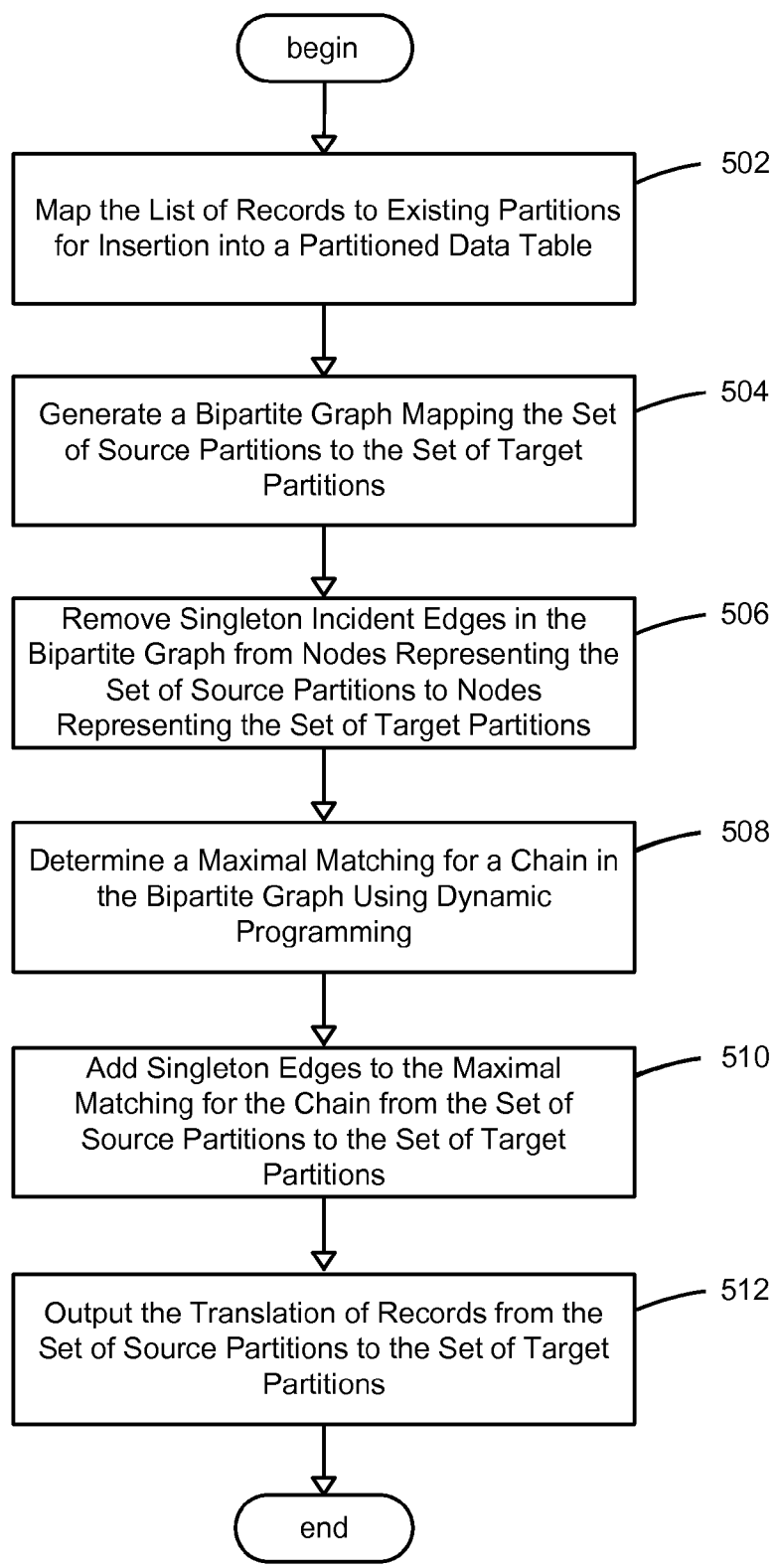
FIG. 5 is a flowchart generally representing the steps undertaken in one embodiment for determining a translation of records from a set of source partitions to a set of target partitions mapped as a bipartite graph, in accordance with an aspect of the present invention.

FIG. 5 presents a flowchart generally representing the steps undertaken in one embodiment for determining a translation of records from a set of source partitions to a set of target partitions mapped as a bipartite graph. At step 502, a list of records may be mapped to existing partitions for insertion into a partitioned data table. At step 504, a bipartite graph mapping a set of source partitions to a set of target partitions may be generated. At step 506, singleton edges in the bipartite graph may be removed that connect nodes representing the set of source partitions and nodes representing the set of target partitions. At step 508, a maximal matching for the chain of nodes remaining in the bipartite graph may be determined using dynamic programming.

At step 510, singleton edges may be added to the maximal matching for the chain of nodes to generate a maximal matching for translation of records from a set of source partitions to a set of target partitions. And step 512, the maximal matching for translation of records from a set of source partitions to a set of target partitions may be output.

Figure 6:
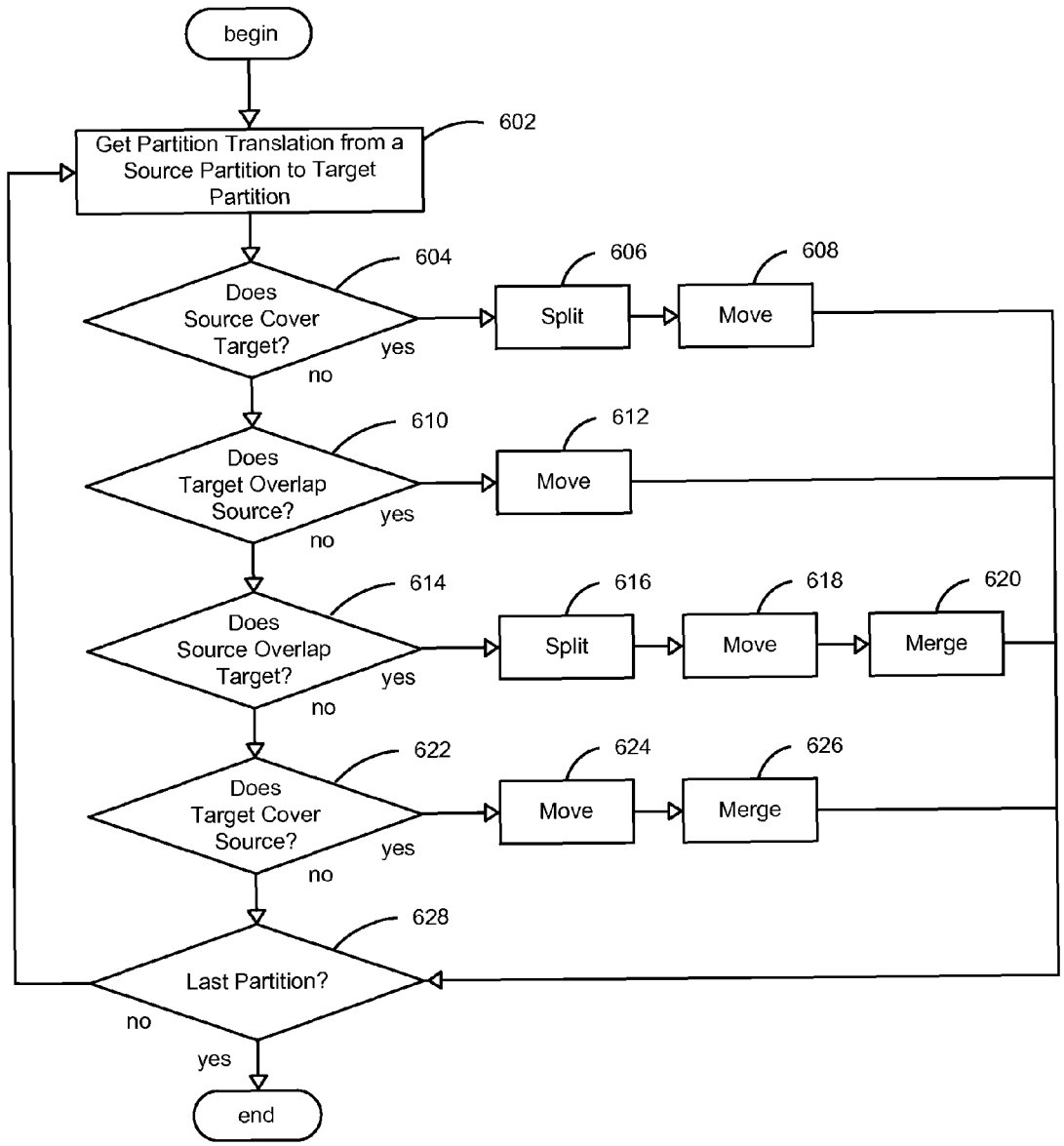
FIG. 6 is a flowchart generally representing the steps undertaken in one embodiment for determining an optimal sequence of operations to transfer records from the set of source partitions to the set of target partitions, in accordance with an aspect of the present invention.
Figure 7:
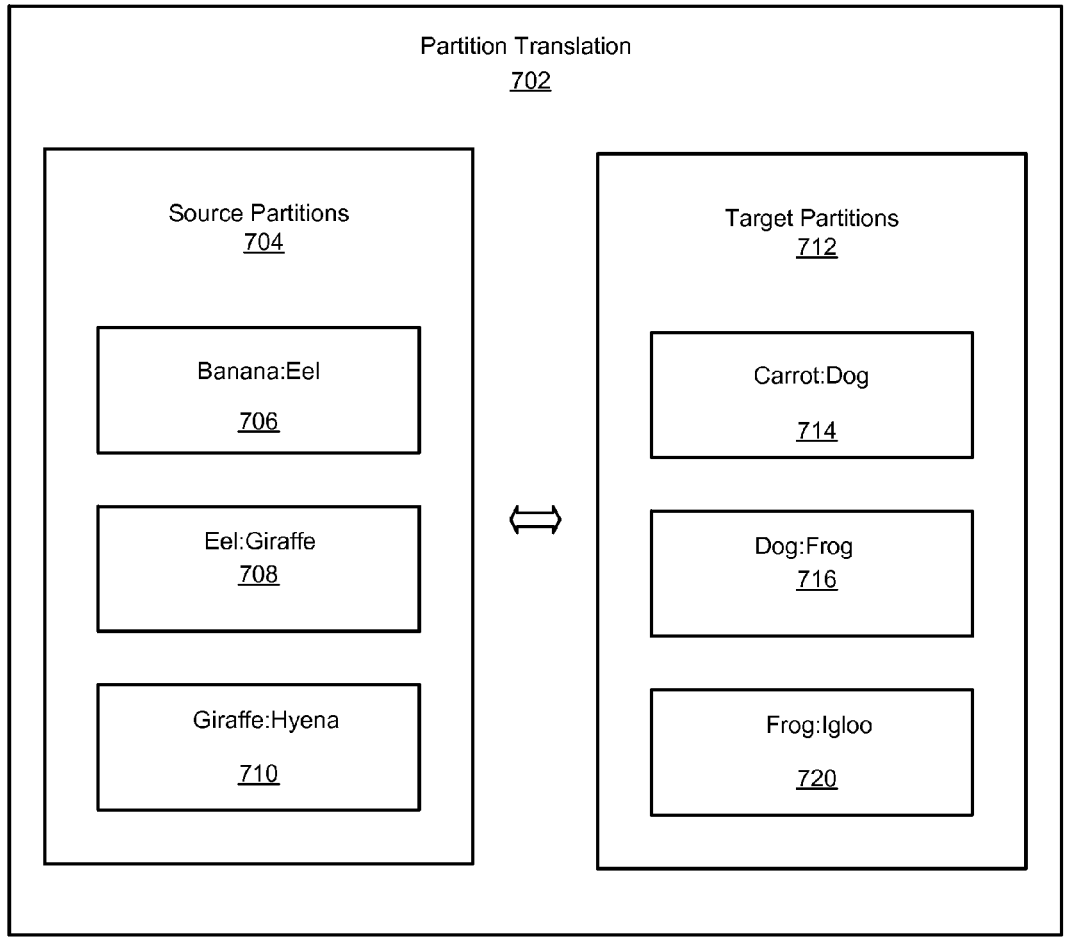
FIG. 7 is an illustration depicting in an embodiment a partition translation in an embodiment from source partitions to target partitions, in accordance with an aspect of the present invention.

FIG. 6 presents a flowchart generally representing the steps undertaken in one embodiment for determining an optimal sequence of operations to transfer records from the set of source partitions to the set of target partitions. At step 602, a partition translation may be obtained to transfer records from a source partition to a target partition. In general, the set of source partitions and the set of target partitions are each in order by record key. Both sets may be traversed from top to bottom in record key order and the partition with the next beginning record key that has not yet been processed may be selected. For example, FIG. 7 presents an illustration of a partition translation 702 from source partitions 704 to target partitions 712. The source partitions 704 and the target partitions 712 are each in order by record key. For instance, source partition 704 includes the partitions banana:eel 706, eel:giraffe 708, and giraffe:hyena 710. And target partition 712 includes the partitions carrot:dog 714, dog:frog 716, and frog:igloo 720. In a traversal of partitions from top to bottom, a partition translation of banana:eel 706 and carrot:dog 714 may be selected first, partition translation of dog:frog 716 and banana:eel 706 may be selected second, partition translation of eel:giraffe 708 and dog:frog 716 may be selected third, and partition translation frog:igloo 720 and giraffe:hyena 710 may be selected fourth.

Returning to FIG. 6, it may be determined at step 604 whether the source partition covers the target partition. In this case, the entire range of record keys in the target partition also occurs in the source partition. Thus, the record key boundaries of a source partition begin before and end after the record key boundaries of a target partition. For example, consider that the partition translation selected is a source partition (banana:eel) and a target partition (carrot:dog), the first record key boundary of the source partition, "banana," begins before the first record key boundary of the target partition, "carrot;" and the last record key boundary of the source partition, "eel," ends after the last record key boundary of the target partition, "dog." Assume that a previous operation set placed the target partition (banana:carrot) on a machine location assigned for that target partition. Then a split operation and a move operation may place the target partition (carrot:dog) on a machine assigned for that target partition. The split operation split((source partition), target partition ending key) may split the source partition at the ending record key of the target partition. For instance, the split operation split((banana:eel),dog) creates a partition (banana:dog) and a partition (dog:eel). The desired target partition (carrot:dog) may then be produced from the partition (banana:dog). Then the move operation move((carrot:dog), machine location) may move the target partition (carrot:dog) to the location assigned for the target partition. Thus, if the source partition covers the target partition, then the source partition may be split at step 606, and the target partition may be moved at step 608 to the location assigned for the target partition.

If the source partition does not cover the target partition, then it may be determined at step 610 whether the target partition overlaps the source partition. In this case, a predominant range of keys in the target partition occur in the source partition. For example, a predominant range of keys in the target partition (dog:frog) may occur in the source partition (banana:eel). If so, then the target partition exists on a machine location assigned to the source partition from a previous set of operations such as the split operation at step 606. Returning to the example discussed above in conjunction with steps 604 and 606, the operation, split((banana:eel), dog), created a partition (banana:dog) and a partition (dog:eel). Thus, the target partition (dog:eel) exists on a machine location assigned to the source partition (banana:eel) from a previous set of operations. A move operation, move((target partition), target machine location), may then move the target partition (dog:eel) at step 612 to the machine location assigned for the target partition.

If the target partition does not overlap the source partition, then it may be determined at step 614 whether the source partition overlaps the target partition. In this case, a predominant range of keys in the target partition occur in the source partition. If so, then the source partition may be split at step 616, a partition may be moved at step 618 to the machine location assigned to the target partition, and the partition may be merged at step 620 with another partition at the location assigned to the target partition to produce the target partition.

For example, given a source partition (eel:giraffe) and target partition (dog:frog), the first record key boundary of the source partition, "eel," begins after the first record key boundary of the target partition, "dog"; and the last record key boundary of the source partition, "giraffe," ends after the last record key boundary of the target partition, "frog." The source partition may be split at the ending key of target partition into a first and second partition. For instance, the split operation, split(eel:giraffe, frog), produces a first partition (eel:frog) and a second partition (frog:giraffe). The first partition resulting from splitting the source partition may be moved to the machine location assigned for the target partition.

And then a merge operation may merge the target partition with the moved first partition at the machine location of the target partition. Note that the target partition (dog:eel) exists on a machine location assigned to the target partition from a previous set of operations such as the move operation at step 612. Given that the target partition (dog:eel) was previously placed at the machine location assigned to the target partition, a merge operation, merge((target partition), moved first partition), may then merge the target partition, (dog:eel), and the moved first partition, (eel:frog), at the machine location assigned for the target partition to produce (dog,frog).

If the source partition does not overlap the target partition, then it may be determined at step 622 whether the target partition covers the source partition. In this case, the entire range of record keys in the source partition also occurs in the target partition. Thus, the record key boundaries of a target partition begin before and end after the record key boundaries of a source partition. For example, given the target partition (frog:igloo) and a source partition (giraffe:hyena), the first record key boundary of the target partition, "frog," begins before the first record key boundary of the source partition, "giraffe;" and the last record key boundary of the target partition, "igloo," ends after the last record key boundary of the source partition, "hyena."

If so, then the source partition may be moved at step 624 to the machine location assigned to the target partition, and the moved source partition may be merged at step 626 with target partition at the machine location of the target partition. For instance, the move operation, move((giraffe:hyena), target machine location) may move the source partition (giraffe:hyena) to the location assigned for the target partition. And then the merge operation, merge((giraffe:hyena), (frog:igloo)) may be performed to produce the target partition (frog:igloo) at the location assigned for the target partition.

If the target partition does not cover the source partition, then it may be determined at step 628 whether the last partition translation to transfer records from a source partition to a target partition has been processed. If so, then processing may be finished. Otherwise, processing may continue at step 602 where another partition translation may be obtained to transfer records from a source partition to a target partition.

Thus the present invention may seamlessly allocate and balance storage space through partition splits, moves, and merges for bulk insertion of records in a distributed database of partitioned data tables. During bulk loading, the system and method may flexibly handle both sparse record inserts and dense record inserts where bulk record inserts densely hit a part of the key range. In the case of dense record inserts, many or most of the existing or newly split partitions will overflow when adding records. Accordingly, the system and method may choose a partitioning of key ranges that respects fill factor constraints and moves partitions between machines to balance the number of insertions per machine.

As can be seen from the foregoing detailed description, the present invention provides an improved system and method for loading records into a partitioned database table. A translation of records may be generated from a set of source partitions to a set of target partitions by generating a bipartite graph, determining a maximal matching using dynamic programming for a chain of nodes remaining in the bipartite graph after removing singleton edges, and generating a maximal matching after adding back the singleton edges for translation of records from the set of source partitions to the set of target partitions. The partition translation may be executed by traversing from top to bottom the set of source partitions and the set of target partitions in record key order to generate an optimal sequence of operations to transfer the records from the set of source partitions to the set of target partitions. Advantageously, the invention makes loading of a large number of records much more efficient by minimizing record movement across machines and maximizing parallelism. Accordingly, the system and method provide significant advantages and benefits needed in contemporary computing and in large-scale distributed databases.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for loading records into a database, comprising:
   a processor device configured to operate as a bulk loader performing:
      executing a bulk insertion of a list of records into a partitioned data table by translating records from a plurality of source partitions of the data table mapped in a bipartite graph to a plurality of target partitions of the data table, said translating comprising:
         removing at least one edge that is an only edge connected to a node in said bipartite graph; and
         determining a maximal matching for a chain in the bipartite graph using dynamic programming; and
         adding the at least one edge to the maximal matching for the chain; and
   a storage operably coupled to the database for storing the plurality of source partitions of the data table and the plurality of target partitions of the data table.

2. The system of claim 1 further comprising a partition translator operably coupled to the bulk loader for determining the translation of records from the plurality of source partitions of the data table mapped in the bipartite graph to the plurality of target partitions of the data table.

3. The system of claim 1 further comprising a partition transfer optimizer operably coupled to the database engine for determining an optimal sequence of operations to transfer records from the plurality of source partitions of the data table mapped in the bipartite graph to the plurality of target partitions of the data table.

4. A non-transitory computer-readable medium having computer-executable components comprising the system of claim 1.

5. A computer-implemented method for loading records into a database, comprising:
   receiving a plurality of records to insert into a partitioned data table;
   determining a translation of the plurality of records from a plurality of source partitions of the data table mapped in a bipartite graph to a plurality of target partitions of the data table, said determining comprising:
      removing at least one edge that is an only edge connected to a node in the bipartite graph; and
      determining a maximal matching for a chain in the bipartite graph using dynamic programming;
   adding the at least one edge to the maximal matching for the chain;
   determining an optimal sequence of operations to transfer at least one of the plurality of records from the plurality of source partitions of the data table mapped in the bipartite graph to the plurality of target partitions of the data table;
   and performing the optimal sequence of operations to transfer the at least one of the plurality of records from the plurality of source partitions of the data table mapped in the bipartite graph to the plurality of target partitions of the data table.

6. The method of claim 5 wherein performing the optimal sequence of operations to transfer the at least one of the plurality of records from the plurality of source partitions of the data table mapped in the bipartite graph to the plurality of target partitions of the data table comprises storing the plurality of records transferred from the plurality of source partitions of the data table to the plurality of target partitions of the data table.

7. The method of claim 5 wherein determining the translation of the plurality of records from the plurality of source partitions of the data table mapped in the bipartite graph to the plurality of target partitions of the data table comprises mapping the plurality of records to a plurality of existing partitions for insertion in the partitioned data table.

8. The method of claim 5 wherein determining the translation of the plurality of records from the plurality of source partitions of the data table mapped in the bipartite graph to the plurality of target partitions of the data table comprises generating the bipartite graph mapping the plurality of source partitions of the data table to the plurality of target partitions of the data table.

9. The method of claim 5 wherein determining the translation of the plurality of records from the plurality of source partitions of the data table mapped in the bipartite graph to the plurality of target partitions of the data table comprises outputting the translation of the plurality of records from the plurality of source partitions of the data table mapped in the bipartite graph to the plurality of target partitions of the data table.

10. The method of claim 5 wherein determining an optimal sequence of operations to transfer at least one of the plurality of records from the plurality of source partitions of the data table mapped in the bipartite graph to the plurality of target partitions of the data table comprises obtaining a partition translation from a source partition to a target partition.

11. The method of claim 5 wherein determining the optimal sequence of operations to transfer at least one of the plurality of records from the plurality of source partitions of the data table mapped in the bipartite graph to the plurality of target partitions of the data table comprises:
    determining that a range of record keys in a target partition overlaps a range of record keys in a source partition;
    and moving a partition resulting from previously splitting the source partition to a machine location assigned for the target partition.

12. The method of claim 5 wherein determining the optimal sequence of operations to transfer at least one of the plurality of records from the plurality of source partitions of the data table mapped in the bipartite graph to the plurality of target partitions of the data table comprises:
    determining that a range of keys in a target partition covers a range of record keys in a source partition;
    moving the source partition to a machine location assigned for the target partition;
    and merging the source partition with the target partition.

13. The method of claim 5 wherein determining the optimal sequence of operations to transfer at least one of the plurality of records from the plurality of source partitions of the data table mapped in the bipartite graph to the plurality of target partitions of the data table comprises:
    determining that a range of record keys in a source partition overlaps a range of record keys in a target partition;
    splitting the source partition at an ending record key of the target partition into a first and second partition;
    moving the first partition to a machine location assigned for the target partition; and
    merging the first partition with the target partition.

14. A non-transitory computer-readable medium having computer-executable instructions for performing the method of claim 5.

15. A computer-implemented method for loading records into a database, comprising:
    receiving a plurality of records to insert into a partitioned data table;
    determining a translation of the plurality of records from a plurality of source partitions of the data table mapped in a bipartite graph to a plurality of target partitions of the data table;
    determining an optimal sequence of operations to transfer at least one of the plurality of records from the plurality of source partitions of the data table mapped in the bipartite graph to the plurality of target partitions of the data table, comprising:
    determining that a range of record keys in a source partition covers a range of record keys in a target partition;
    splitting the source partition at an ending record key of the target partition into a first and second partition; and
    moving a plurality of records from the first partition to a machine location assigned for the target partition; and
    performing the optimal sequence of operations to transfer the at least one of the plurality of records from the plurality of source partitions of the data table mapped in the bipartite graph to the plurality of target partitions of the data table.

* * * * *